United States Patent

Zimmerman

[15] 3,690,427
[45] Sept. 12, 1972

[54] POSITIVE SHIFTED JAW CLUTCH

[72] Inventor: Arnold Zimmerman, Downers Grove, Ill.

[73] Assignee: International Harvester Company, Chicago, Ill.

[22] Filed: Sept. 10, 1970

[21] Appl. No.: 71,168

[52] U.S. Cl..................................192/24, 192/93 A
[51] Int. Cl..............................................F16d 11/04
[58] Field of Search.......192/24, 25, 93 A, 89 A, 114

[56] References Cited

UNITED STATES PATENTS

| | | | |
|---|---|---|---|
| 2,894,775 | 7/1959 | Harless | 192/93 A |
| 3,161,269 | 12/1964 | Janssen | 192/24 |
| 3,386,546 | 5/1968 | Yourich | 192/114 |

Primary Examiner—Benjamin W. Wyche
Assistant Examiner—Randall Heald
Attorney—Floyd B. Harman

[57] ABSTRACT

A positive drive clutch capable of being power shifted into a coupled and uncoupled operating mode by included shifting components which move relative to other clutch members only during the event of engagement and disengagement of the clutch.

11 Claims, 5 Drawing Figures

PATENTED SEP 12 1972 3,690,427

INVENTOR
ARNOLD ZIMMERMAN

INVENTOR
ARNOLD ZIMMERMAN

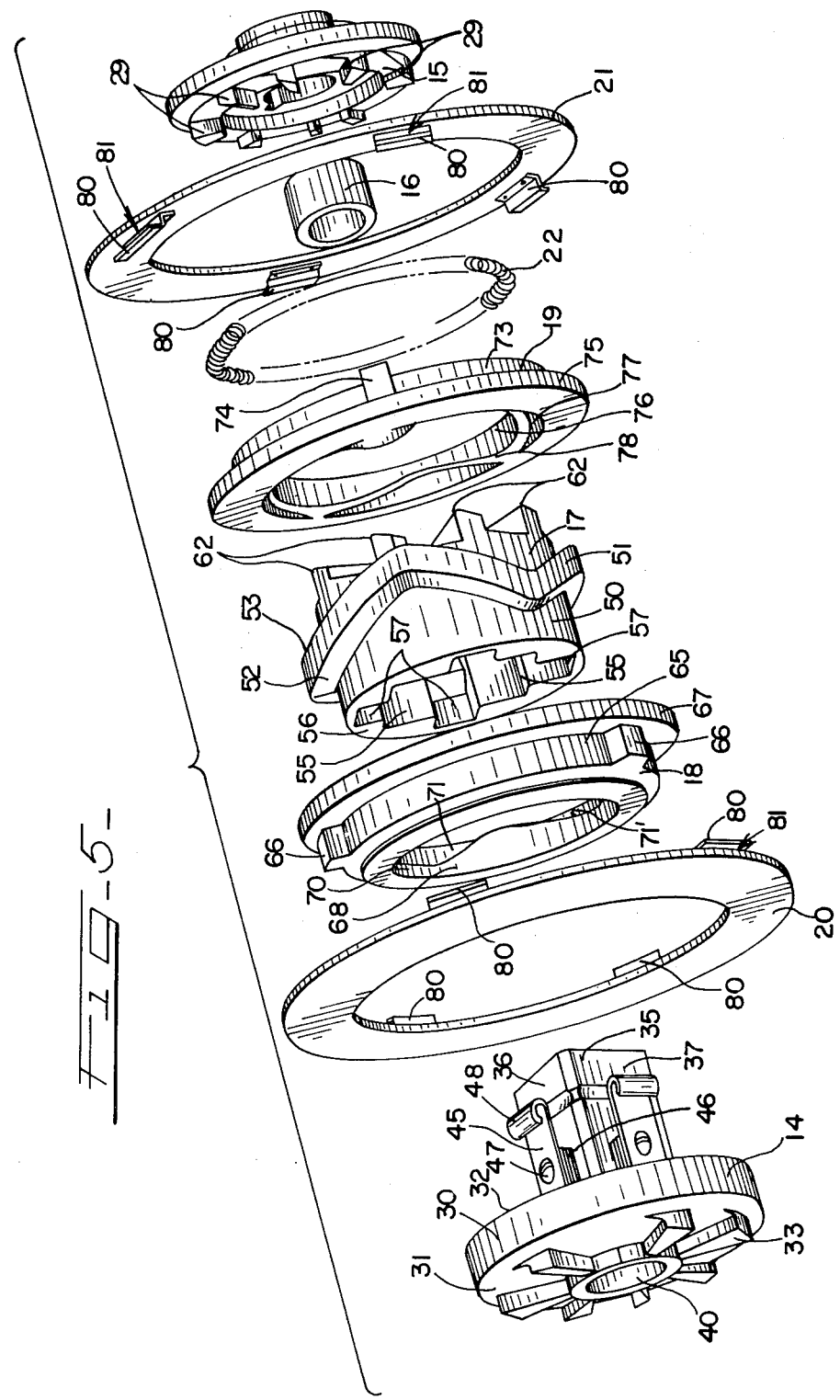
FIG-5-
INVENTOR
ARNOLD ZIMMERMAN

POSITIVE SHIFTED JAW CLUTCH

BACKGROUND OF THE INVENTION

The instant invention relates to a positive drive clutch mechanism adaptable to be used on trailing vehicles such as forage wagons, manure spreaders, and other types of unloading wagons which characteristically incorporate driven machinery such as driven material beds, unloading and distributing augers, material distributing machinery and the like. Such machines are usually driven from the power take-off unit of an associated pulling vehicle which transfers power to a power distributing train on the wagon by means of an extensible drive shaft. In order to assure safe and efficient operation it is desirable to interpose in the power carrying shafts of the power train a positive drive clutch which can transmit high power loads without slipping, but yet can be positively engaged and disengaged at will.

It is also desirable during the period when power is being fed into the power carrying shafts that the shifting components of the clutch which ride or bear against one another have no continual relative motion with respect to each other during operation in both the engaged and disengaged positions, for when this is accomplished the life of the clutch is extended because of the minimal internal wearing of the clutch components.

A general object of the invention is to provide a positive drive clutch which will not slip under heavy loading.

Another object of the invention is to provide a positive drive clutch which can be independently shifted to transmit and interrupt power transfer from an input to an output shaft.

Still another object of the invention is to provide that the clutch be operable within fixed limits of movement on the output shaft.

A still further object of the invention is to provide that the shifting components of the clutch which ride and wear against each other move relative to one another only during shifting operations.

Another object of the foregoing is to provide that the clutch be of the jaw type including one rotatably driven part having a plurality of teeth concentrically arranged relative to the output shaft and movable into driving engagement with a complementary receiving part secured to the output shaft.

A more specific object of the foregoing is to provide that the aforementioned movable part have a cam follower with a plurality of apices and is moved into and out of engagement with the other part by cam elements having mating cam surfaces coacting with the apices, wherein the angular displacement of the apices and the teeth each define a quantity of spaces therebetween which are not multiples of one another.

Another object of the invention is to provide a means of biasing each of the cam elements toward the cam follower in order that a mating relation occurs between corresponding cam surfaces whereupon the cam elements are constrained to rotate with the movable part.

Other objects and features of the invention will become apparent as the description proceeds, especially when taken in conjunction with the accompanying drawings illustrating a preferred embodiment of the invention.

BRIEF DESCRIPTION OF THE DRAWINGS

FIG. 5 is an exploded view of the clutch showing the parts in axonometric projection.

DESCRIPTION OF THE PREFERRED EMBODIMENT

Figure 1:
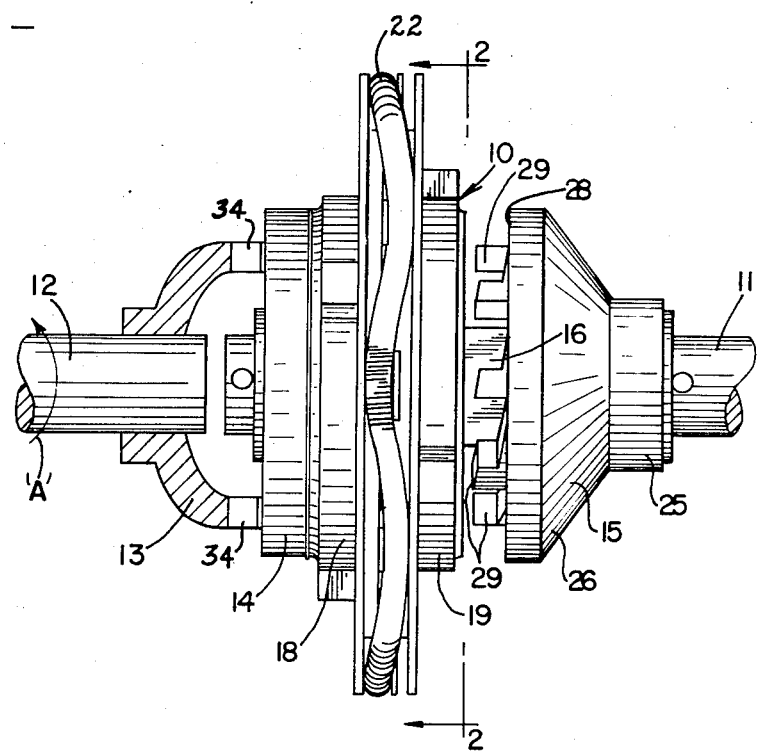
FIG. 1 is an elevational view of the clutch showing the input portion in section.

Turning attention to FIG. 1, the instant invention, namely a jaw clutch generally designated 10, is shown mounted on a power output shaft 11 which is disposed in substantial axial alignment with a power input shaft 12. A driving hub 13 is shown secured to the input shaft 12 and disposed in driving engagement with the clutch 10.

Referring to FIG. 5, a brief description of the components of the clutch will be helpful in a subsequent more detailed description. The clutch 10 comprises an input element 14 and output element 15 spaced apart by a collar 16. The input element 14 slideably receives a sliding jaw member 17 which moves thereon to selectively engage the output element 15. The jaw member 17 is moved in and out of engagement from the output element 15 through the action shifting components comprising engaging and disengaging shifting cams 18 and 19 respectively. Biasing rings 20 and 21 along with an associated spring 22 act to maintain the shifting cams in a proper relationship to the jaw member 17.

The output element 15 comprises a hub 25 which merges into a conically shaped body portion 26. The hub 25 is secured to the output shaft by means of a key 27 (See FIG. 3) in a manner well known in the art, whereby the element 15 is constrained to rotate with the shaft 11. The body 26 has a radial surface 28 oriented substantially normal to the principal axis of the output shaft 11. A plurality of drive teeth 29 protrude outwardly from the face 28 in concentric arrangement to the output shaft 11 and at a location slightly below the outer extremity of the body 26 to thereby define an outer portion of the surface 28 which acts as a stop and a reactive member for the disengaging cam 19, as will be explained hereinbelow.

Figure 4:
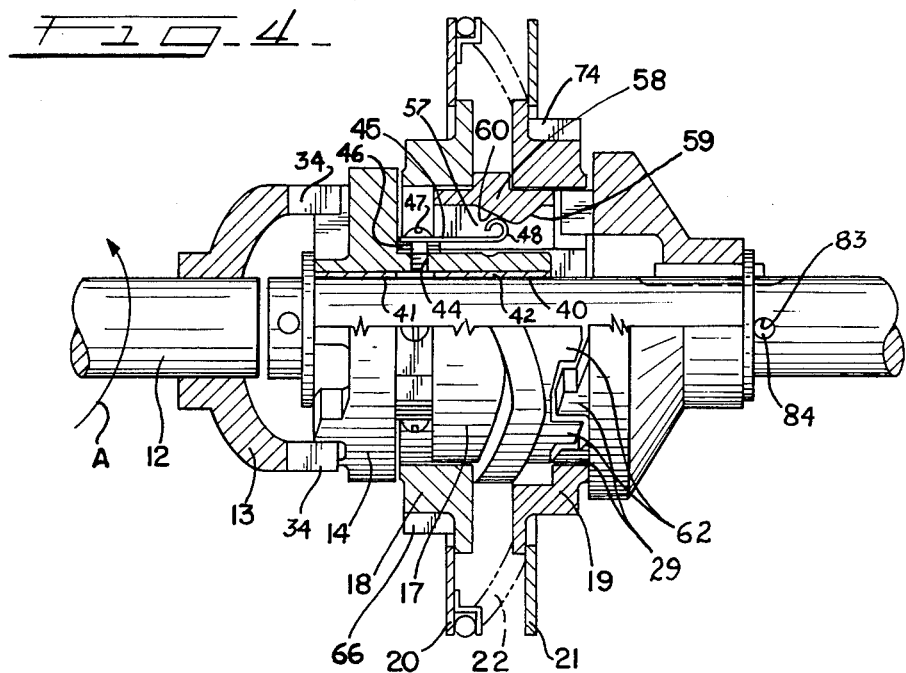
FIG. 4 is an elevational view with parts cut away and partially in section showing internal parts of the clutch in an engaged mode.

The input element 14 is mounted adjacent the output element 15 and spaced therefrom by the collar 16. The input element 14 comprises an annular portion 30 having radially disposed surfaces 31 and 32. A plurality of drive lugs 33 are arranged on the outwardly facing surface 31, as best seen in FIG. 5. The driving hub 13 comprises a plurality of teeth 34 of complementary number, spacing, and shape such that a driving engagement between the input shaft 12 and the input element 14 can be provided by means of arranging the driving hub 13 in meshing engagement with the input element 14 as shown in FIG. 4. The input element 14 also includes shank or sleeve 35 which extends from the inner face 32 of the annular portion 30. The shank 35 has a square cross section producing substantially identical side walls 36, 37, 38 and 39. The entire input element 14 has an internal bore 40 which receives sleeve bearings 41 and 42. The bearings 41, 42 provide a bearing surface for the input element 14 as it rotatably rides on the output shaft 11. Each side (36, 37, 38, 39) of the shank 35 has a centrally located threaded bore 44 therethrough which has been located adjacent the surface 32 of the annular portion 30. An elongated spring element 45 is mounted in cantilever fashion on each side of the shank 35 and aligned with the principal axis of the internal bore 40 which is coincidental with the axis of rotation of the output shaft 11. Each of the spring elements 45 are spaced outwardly from their respective walls (36, 37, 38, 39) by a spacer 46 through which a screw 47 secures one end of each spring element to its respective side of the shank portion at a location adjacent the surface 30. The free end of each spring element 45 has outwardly curved distal end 48. It should also be noted in passing that the annular portion 30 of the input element 14 extends outwardly to a sufficient diametrical size to assure that it will serve as a stop and reactive member for the engaging cam 18.

The sliding jaw member 17 has a cylindrically shaped body having a circumferential surface 50 from which protrudes a cam follower in the form of an undulating rib 51 circumferentially disposed about the periphery thereof. The rib defines radially disposed cam surfaces 52 and 53 oriented in planes substantially normal to the principal axis of the body of the jaw member such that each cam surface (52, 53) forms a sinusoidally contoured undulation relative to that principal axis. The body has a centrally located square-shaped inner bore therethrough defining inner walls 55 each being spaced equidistantly from the principal axis of the body. The spacing between the inner walls 55 is slightly greater than the cross sectional dimensions of the shank 35 of the input member 14 in order that the inner bore 54 can freely receive the shank 35 and be capable of sliding movement thereon. At one end of the body of the jaw member 17 is a wall 56 arranged substantially normal to the principal axis thereof. Extending inwardly from that wall (56) are four essentially identical channels 57 disposed in alignment with the principal axis of the body of the jaw member 17 and oriented intermediate respective inner walls 55 as shown in FIG. 5. Each channel 57 is aligned and has a width and depth sufficient to freely receive one of the respective spring elements 45.

Figure 3:
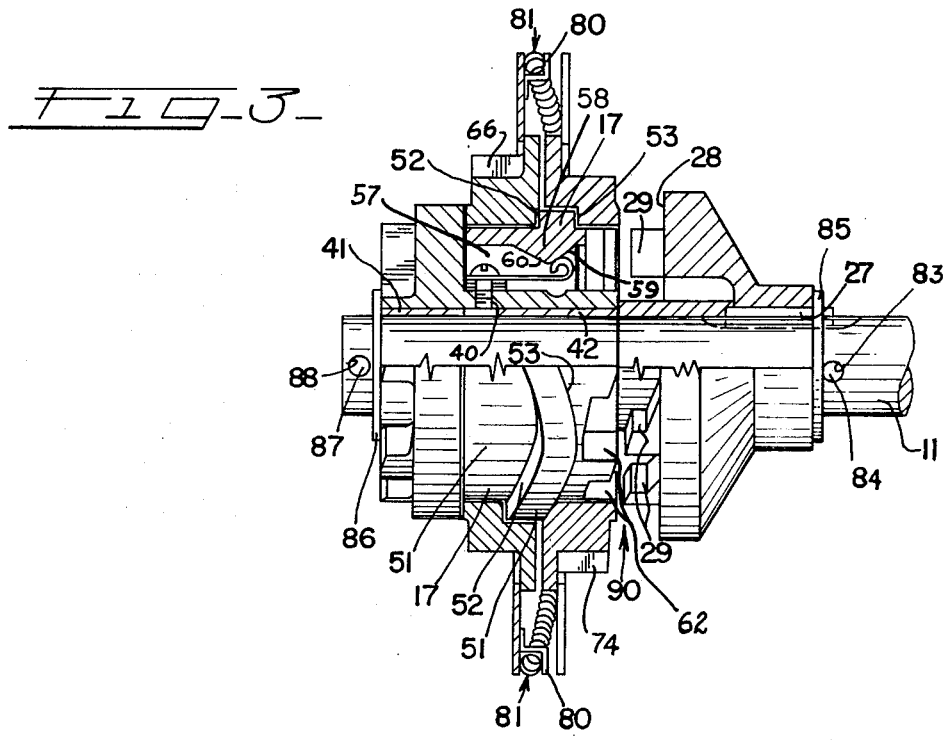
FIG. 3 is an elevational view with parts cut away and partially in section showing internal parts of the clutch in an disengaged mode.

As best seen in FIGS. 3 and 4 each channel 57 has formed therein a protrusion of triangular cross section serving as a dog 58 which is disposed off of center of the axial extent of the jaw member 17. Each dog 58 has surfaces 59 and 60 which serve as a detent or retainer which in cooperation with its respective spring 45 yieldably hold the jaw member 17 from axial movement. On the other end of the body of the jaw member 17 are arranged a plurality of outwardly extending teeth 62 concentrically disposed about the principal axis of the body. The teeth 62 are spaced apart equal distances and each has a beveled outer facing surface which aids clutch engagement. The teeth 62 are spaced apart in a manner which will complement and effect a meshing engagement with the drive teeth 29 of the output element 15. It should be noted that each of the drive teeth 29 also have a similarly angled and outwardly facing beveled surface as the teeth 62 of the sliding jaw member 17. These beveled surfaces act to provide tangential forces between the jaw member 17 and the output element 15 to effect a relative shifting therebetween in order that they can slide on one another to position themselves in meshing engagement upon engagement of the clutch.

The engaging and disengaging cams 18 and 19 respectively are essentially identical in make-up. As best seen in FIG. 5 the engaging cam 18 comprises a ring shaped body 65 having three identical lugs 66 extending radially therefrom at substantially equal 120 degree angular displacements. At one end of the body is an annular shoulder 67 which extends radially outward beyond the extremities of the lugs. The body 65 has a first inner cylindrical wall 68. The internal diameter 70 of the wall 68 is slightly greater than the outer diameter of the cylindrical body of the sliding jaw member 17 so that the cam 18 can freely slide thereon. A second inner wall 71 of greater diameter than the first inner wall is also formed within the body 65 in such a manner that there is constructed an undulating radial surface 71' having a sinusoidal contour with a mating relation to the surface 52 of the cam follower 51 on the sliding jaw member 17.

Since the disengaging cam 19 is essentially the same as the engaging cam hereinbefore described, different reference numerals will be assigned to the disengaging cam, it being understood that the same structural description will apply to both cams the only difference being in the designation of the parts thereof. The disengaging cam 19 therefore comprises a body 73, three lugs 74, a shoulder 75, first and second inner cylindrical walls 76 and 77 respectively and undulating radial surface 78.

The biasing rings 20 and 21 are also essentially identical in make-up. Each ring has an inner opening having a diameter of a magnitude to allow the ring to pass over the lugs of its respective cam and rest against the shoulder thereof. Each ring has four spring retaining clips 80 spot welded at about 90° intervals in a concentric disposition relative to the inner opening of the ring and arranged outwardly therefrom so that the rings (20, 21) can rest against the shoulder (67, 75) with each clip 80 being positioned over and outwardly of its particular shoulder. It can be seen that each clip 80 provides a spring retaining space 81.

The clutch is assembled on the output shaft 11 in a manner best illustrated in FIGS. 3, 4 and 5. A hole 83 disposed in the output shaft 11 at a location inwardly from the end thereof has a pin 84 secured therethrough. A washer 85 is arranged adjacent the pin 84 and the hub 25 of the output member 15. Next to the output member 15 on the shaft 11 are mounted the collar 16 and input member 14 and secured in that order from axial movement by another washer 86 retained by a pin 87 disposed through a hole 88 near the end of the output shaft 11. It should be noted that the sliding jaw member 17 has been mounted onto the shank 35 of the input member 14 with each of the cams 18 and 19, and biasing ring 20 and 21 positioned in place thereon as shown. It can also be seen in FIG. 3, (which shows the clutch assembled and in the disengaged position) that the curved distal end 48 of the holding spring 45 is positioned against the surface 59 of the dog 58 whereat a space 90 is provided between the jaw member 17 and the output element 15, the space 90 being sufficient to assure clearance between the teeth 62 and 29 and thereby effect disengagement of the clutch in that position.

The biasing rings 20, 21 are oriented relative to each other such that the clips 80 on each ring are alternatively spaced at about 45° displacements. The biasing spring 22 is alternately arranged in each of the spaces 81 formed by the clips. The peripheral dimensions of the spring 22 is less than the circumferential spacing of the clips 80 to thereby produce a force which urges the rings (and cams on which they are mounted) axially together.

During operation the input shaft 12 is rotated in the direction of the arrow designated A. The input and output shafts are coaxially aligned and the driving hub 13 is in driving engagement with input element 14 of the clutch. The input element 14 can freely rotate on the output shaft and is therefore rotatably driven by the driving hub. In FIG. 3 the clutch is shown in the disengaged position and the sliding jaw member 17 is held in the position, as shown, by the action of the spring elements 45 on their respective dogs 58. It can be appreciated that the cams 18 and 19, biasing rings 20 and 21 and biasing spring 22 all rotate together because the square shape of the shank 36 engages and drives the jaw member 17 whereby the cam follower 51 will drive the cams 18, 19 due to their mated orientation with the cam follower. Frictional forces between cams and the biasing rings will cause these rings to rotate in conjunction with the cams.

Figure 2:
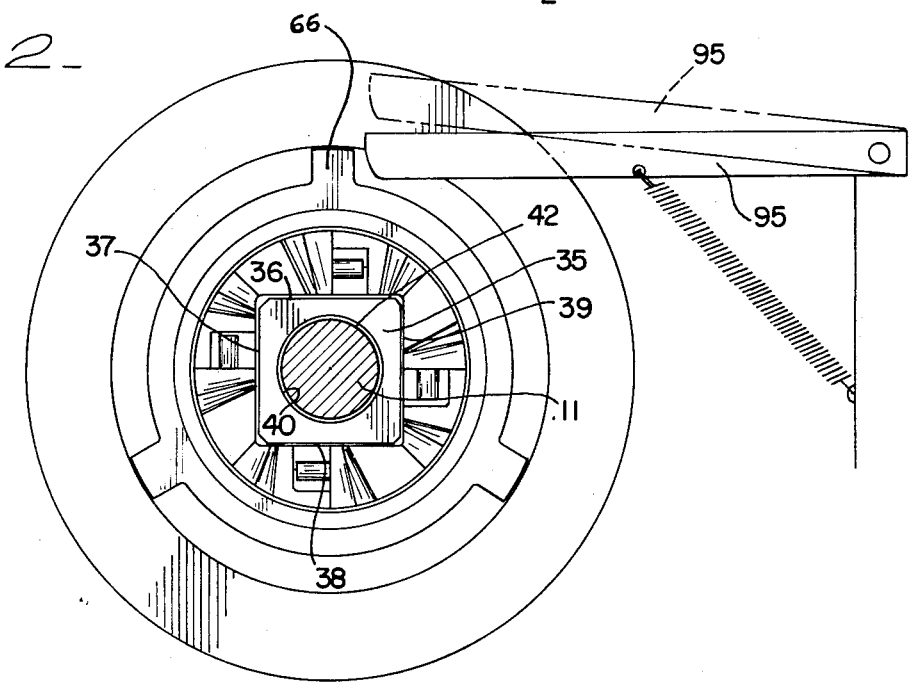
FIG. 2 is an elevational view taken substantially at line 2—2 of FIG. 1.

When the clutch is to be engaged, a stationary member, such as an arm 95 (FIG. 2), engages one of the lugs 66 on the engaging cam 18 and prevents that cam from further rotation. As this occurs a camming action takes place between the surface 52 of the cam follower 51 and the surface 71' of the engaging cam 18. The annular portion 30 of the drive element 14 initially provides a stop against which the engaging cam 18 reacts to prevent axial movement of the cam and instead produces an axial displacement of the sliding jaw member 17 into driving engagement with the output element 15. FIG. 4 depicts this situation in stop motion as it is occurring. It can be seen that the retaining spring elements 45 have deflected and the distal ends 48 thereof engage their respective surfaces 60 of the dogs 58 to thereby retain the jaw member 17 in the engaged position. The engaging cam 18 is still (at this time) against the annular portion 67, and the biasing spring 22 has been stretched and thus produces a biasing force which urges the engaging cam 18 to the right (as viewed in FIG. 4) into mating relationship with the cam follower 51. When the engaging cam 18 moves axially to the right, the arm 95 slips off the lug 66 and the engaging cam 18 again begins to rotate with the sliding jaw 17 to thereby prevent further cam action. The clutch is now in an engaged mode of operation.

For disengagement another arm (not shown) engages one of the lugs 74 on the disengaging cam 19 and prevents that cam from rotating. Initial axial movement of the cam 19 is prevented by the contact of the cam with the radial surface 28 of the body 26 of the output element 15. Cam action now occurs causing the sliding jaw member 17 to slide to the left (as viewed in FIG. 3) and to a position as shown in FIG. 3, with each of the spring elements 45 having been deflected such that the distal ends 48 thereof now engage the surface 59 of their respective dog 58 whereby the jaw member 17 is retained in the disengaged position as shown. Here again the rings 20, 21 and biasing spring 22 act to move the disengaging cam 19 to the left and into mating relation with the cam follower 51 and at the same time out of engagement with the arm that initiated the disengaging action. The clutch is now disengaged as illustrated in FIG. 3.

It can be seen that the instant invention provides a reliable jaw clutch which can be positively engaged and disengaged and yet the shifting components of the clutch which ride and bear against each other have relative motion only during shifting operations. This assures minimal wear on such components.

It should also be noted that the teeth (62, 29) on both the sliding jaw 17 and the output element 15 respectively are equal in number and spaced at approximately 45° angular displacements about their respective locations; while the apices defined by the cam follower 51 are arranged at approximately 120° angular displacements about the cylindrical body of the jaw member 17. The angular displacements of the teeth (62, 29) and the apices of the cam follower 51 are not multiples of one another. This relationship is effected to provide that the teeth 62 and 29 will be driven into meshing engagement by a structure, namely the shifting components, at intervals less likely to produce an initial jamming of the clutch. However, if such should occur the spaced relationship will assure upon a subsequent attempt of engagement sufficient angular shift between the teeth of the jaw member and output element to prevent a repeated jamming action.

It will be appreciated that the embodiment of the the invention chosen for the purposes of illustration and description herein is that preferred based upon requirements for achieving the objects of the invention and developing the utility thereof in the most desireable manner, due regard being had to existing factors of economy, simplicity of design and construction, production methods and the improvements sought to be effected. It will be understood, that the particular structure and functional aspect emphasized herein are not intended to exclude but rather to suggest such other modifications and adaptations as fall within the spirit and scope of the invention.

What is claimed is:
1. A positive drive clutch comprising:
   a drive element having an axis of rotation and receivable of rotational input power;
   a power output element disposed adjacent said drive element in alignment with said axis;
   jaw means mounted on said drive element for rotation therewith, said jaw means movable relative to said drive element in directions of the axis thereof;
   a cam follower on the jaw means projecting radially from the jaw means;
   engaging cam means at one end of the jaw means selectively operative for engaging one side of the cam follower for axially displacing said jaw means into an engaged position with said output element to effect thereat a coupling of said drive and output elements;

disengaging cam means at the other end of the jaw means selectively operative for engaging the opposite side of the cam follower for axially displacing said jaw means into a disengaged position with said output element to effect thereat an uncoupling of said drive and output elements; and releasable holding means for maintaining said jaw means in each of said positions, said respective cam means being operative to release said holding means and effect said axial displacements of said jaw means.

2. The invention as recited in claim 1 wherein said engaging and disengaging cam means comprising a cam element disposed on said jaw member and in mating relation with said follower to effect a rotation therewith, and said cam means including means for selectively inducing a camming action between each of the cam elements and the follower to produce said respective axial displacements of said jaw means.

3. The invention as recited in claim 2 wherein said holding means comprises at least one spring element disposed on one of the jaw means and the drive element, and a dog positioned on the other of the jaw member and the drive element, said dog disposed to engage the spring element to retain the jaw member and output element in both the engaged and disengaged positions.

4. The invention as recited in claim 3 wherein said means to induce camming action of said cam elements, comprises a pair of arms selectively interactable of said cam elements to produce a relative motion between the selected cam element and the follower to induce said camming action.

5. The invention as recited in claim 1 wherein said jaw means comprises a cylindrical jaw member having a plurality of teeth concentrically disposed relative to said axis and at one end thereof, and said output element includes a plurality of surfaces disposed to receive in meshing relation the teeth of said jaw member upon axial displacement and engagement thereof with said output element.

6. The invention as recited in claim 5 wherein said jaw member includes a cam follower defining a pair of undulating cam surfaces circumferentially disposed relative to said axis, said engaging and disengaging cam means each comprising an annular cam element rotatably mounted on said jaw member and having a cam surface positionable in a mating relation to one of said cam surfaces of jaw member whereat each of said cam elements is driven by said jaw member to rotate therewith.

7. The invention as recited in claim 6 wherein said holding means comprises at least one spring element mounted on said drive element, and a dog disposed on said jaw member such that the spring element and dog coact to yieldably retain the jaw member in the engaged and disengaged positions with said output element.

8. A positive drive clutch comprising:
a drive element having an axis of rotation and receivable of rotational input power;
a power output element disposed adjacent said drive element in alignment with said axis;
jaw means mounted on said drive element for rotation therewith, said means movable relative to said drive element in directions of the axis thereof;

engaging cam means selectively operative for axially displacing said jaw means into an engaged position with said output element to effect thereat a coupling of said drive and output elements;

disengaging cam means selectively operative for axially displacing said jaw means into a disengaged position with said output element to effect thereat an uncoupling of said drive and output elements;

holding means for maintaining said jaw means in each of said positions whereat said respective cam means are operative to override said holding means and effect said axial displacements of said jaw means, said jaw means comprises a cylindrical jaw member having a plurality of teeth concentrically disposed relative to said axis and at one end thereof, and said output element includes a plurality of surfaces disposed to receive in meshing relation the teeth of said jaw member upon axial displacement and engagement thereof with said output element, said jaw member includes a cam follower defining a pair of undulating cam surfaces circumferentially disposed relative to said axis, said engaging and disengaging cam means each comprising an annular cam element rotatably mounted on said jaw member and having a cam surface positionable in a mating relation to one of said cam surfaces of jaw member whereat each of said cam elements is driven by said jaw member to rotate therewith; and said cam follower comprises a protruding annular rib extending radially outward of said jaw member defining said respective cam surfaces as radial sides thereof; said cam surfaces of said engaging and disengaging cam elements having a complementary radial orientation relative to the radial cam surfaces of said rib; a first ring slidably mounted on said engaging cam element; a second ring slidably mounted on said disengaging cam element; and a spring operatively connected to said first and second rings to urge them toward one another thereby biasing their respective cam elements toward said rib to induce positioning of the corresponding cam and follower surfaces in said mating relation with each other.

9. The invention wherein said drive element comprises a shank portion having a noncircularly shaped cross section symmetrically disposed relative to said principal axis, said jaw member having a cylindrical shaped outer surface and an internal bore complementarily shaped to receive and slidably move to said axial displacements on said drive element, said jaw member including a protruding element circumferentially disposed on said outer surface and axially undulating about said axis to thereby define first and second radially disposed cam follower surfaces, said engaging and disengaging cam each rotatably mounted on the outer surface of said jaw member at opposite sides of said element and each having a radial cam surface disposed to coact with said first and second follower surfaces respectively to effect displacing the jaw member into the respective position of engagement and disengagement with said output element.

10. The invention as recited in claim 9 wherein said means for retaining said jaw member comprises: at least one spring element connected to said shank portion; a lug disposed on said jaw member to engage said spring element and yieldably retain said jaw member in both the position of engagement and disengagement.

11. The invention as recited in claim 10 wherein said engaging cam includes a first biasing ring slidably mounted thereon, said disengaging cam includes a second biasing ring slidably mounted thereon, a spring interconnecting said biasing rings to urge them toward each other whereupon said engaging and disengaging cams are each biased toward said protruding rib to induce corresponding cam surfaces on the rib and the cams to arrange themselves in mating relation with each other.

* * * * *